United States Patent [19]

Seider et al.

[11] 4,167,983

[45] Sep. 18, 1979

[54] ELECTRICALLY POWERED SERVICE VEHICLE

[75] Inventors: Gene J. Seider, Bloomington; Michael C. Freund, Mendota Heights; James R. Duffy, Inver Grove Heights, all of Minn.

[73] Assignee: Gould Inc., Rolling Meadows, Ill.

[21] Appl. No.: 573,079

[22] Filed: Apr. 30, 1975

[51] Int. Cl.² .......................................... B62D 51/04
[52] U.S. Cl. ................................. 180/19 R; 219/386; 219/433; 296/22
[58] Field of Search ..................... 180/19 R, 19 H, 98; 280/79.3; 296/22; 219/385, 386, 387, 432, 433, 400; 165/2, 48; 312/236

[56] References Cited

U.S. PATENT DOCUMENTS

| | | | |
|---|---|---|---|
| 2,923,365 | 2/1960 | McKechnie | 180/11 |
| 2,948,798 | 8/1960 | Ness | 219/387 |
| 2,973,823 | 3/1961 | Stentz | 180/11 |
| 3,175,534 | 3/1965 | Pollard | 219/400 X |
| 3,474,877 | 10/1969 | Wesener | 180/98 |
| 3,628,624 | 12/1971 | Wesener | 180/98 |
| 3,814,900 | 6/1974 | Frey et al. | 219/385 |
| 3,908,749 | 9/1975 | Williams | 165/2 |
| 3,924,100 | 12/1975 | Mack et al. | 219/386 |
| 3,924,100 | 12/1975 | Mack et al. | 219/386 |

OTHER PUBLICATIONS

*The Sweetheart Serving System,* Sweetheart Plastics, Wilmington, Ma. 01887, (date of publication unknown at this time).

*Primary Examiner*—John A. Pekar
*Attorney, Agent, or Firm*—Leydig, Voit, Osann, Mayer & Holt, LTD.

[57] ABSTRACT

An electrically powered service vehicle having a plurality of programmable electrical stations is exemplified by a food service vehicle for use with food serving trays including internal heating elements for providing localized areas of heat on the trays for maintaining food placed thereon at a desired temperature. The vehicle has a plurality of storage compartments, each of which holds a plurality of the food serving trays in vertically spaced relation to each other. An on-board d-c. power source is connected to the heating elements within the trays via a plurality of electrical contacts within each storage compartment. A d-c. drive motor for propelling the vehicle is selectively connected to the power source through a drive control. The electrical contacts within the storage compartment are positioned to engage corresponding contacts on the trays when the trays are inserted into the storage compartments. The electrical contacts within the storage compartments are part of a plurality of controllable power circuits associated with each tray station within the various compartments for supplying separately controllable power to each individual tray heater, and manually operable programming means are connected to each power circuit and generate control signals to enable or disable each separate circuit to permit the programming of the various tray stations within the storage compartments. A resilient bumper is provided on the front of the vehicle, and bumper switch means are actuated in the event the bumper contacts an external object, with the switch de-energizing the drive motor through the drive control. The d-c. power source also powers an air blower which forces air through an inlet means in the rear wall of each storage compartments and directs a stream of forced air forwardly through the storage compartment on the heated side of the tray. A door covering the front of the storage compartment forms an air outlet adjacent the side wall of the storage compartment on the heated side of the trays so that the forwardly flowing stream of forced air exits through the door.

23 Claims, 13 Drawing Figures

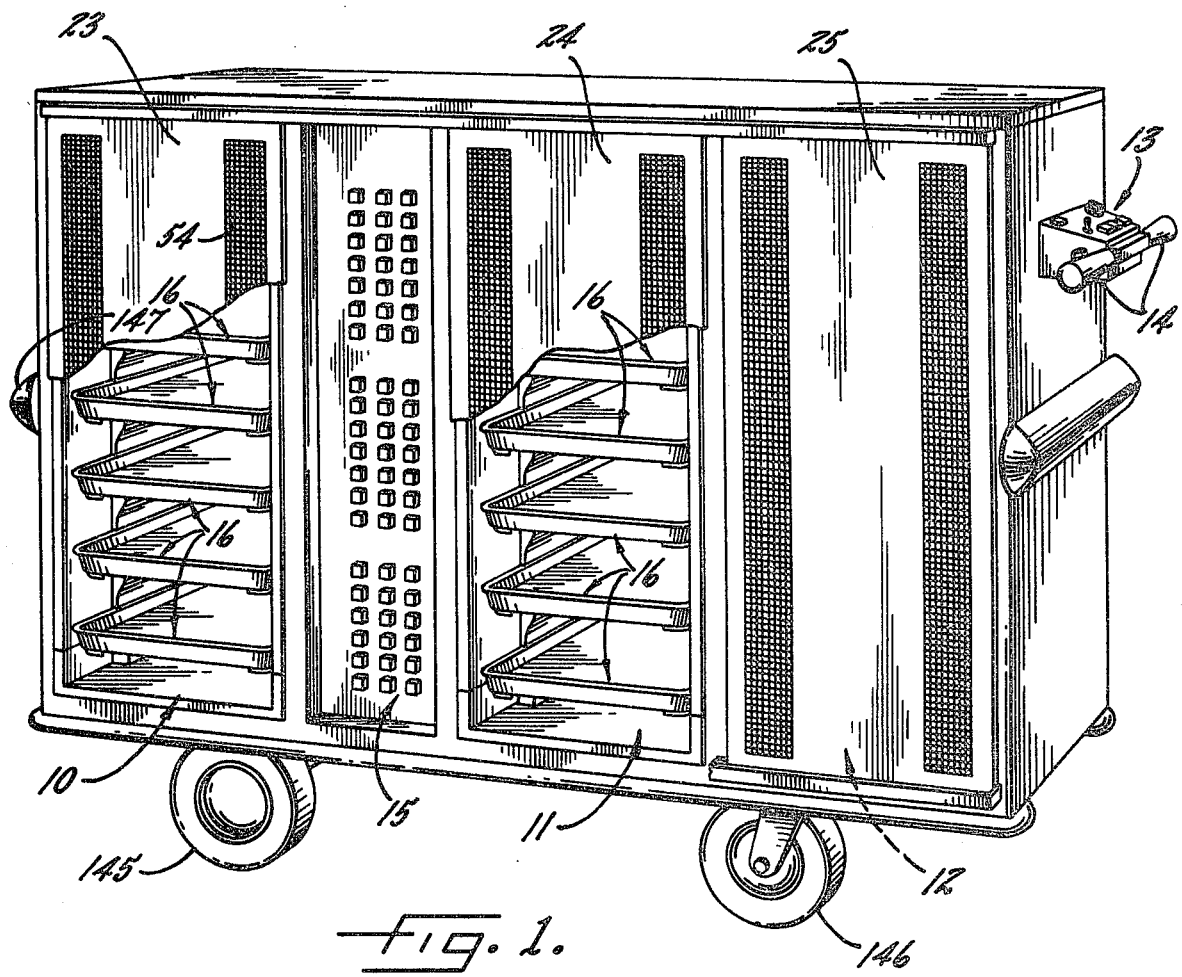
fig. 1.
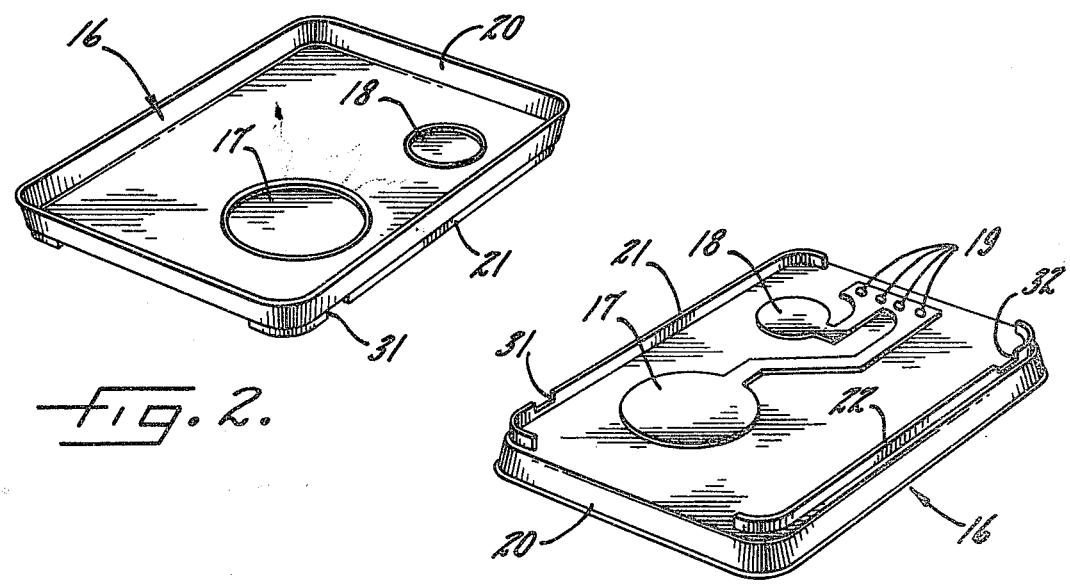
fig. 2.
fig. 3.

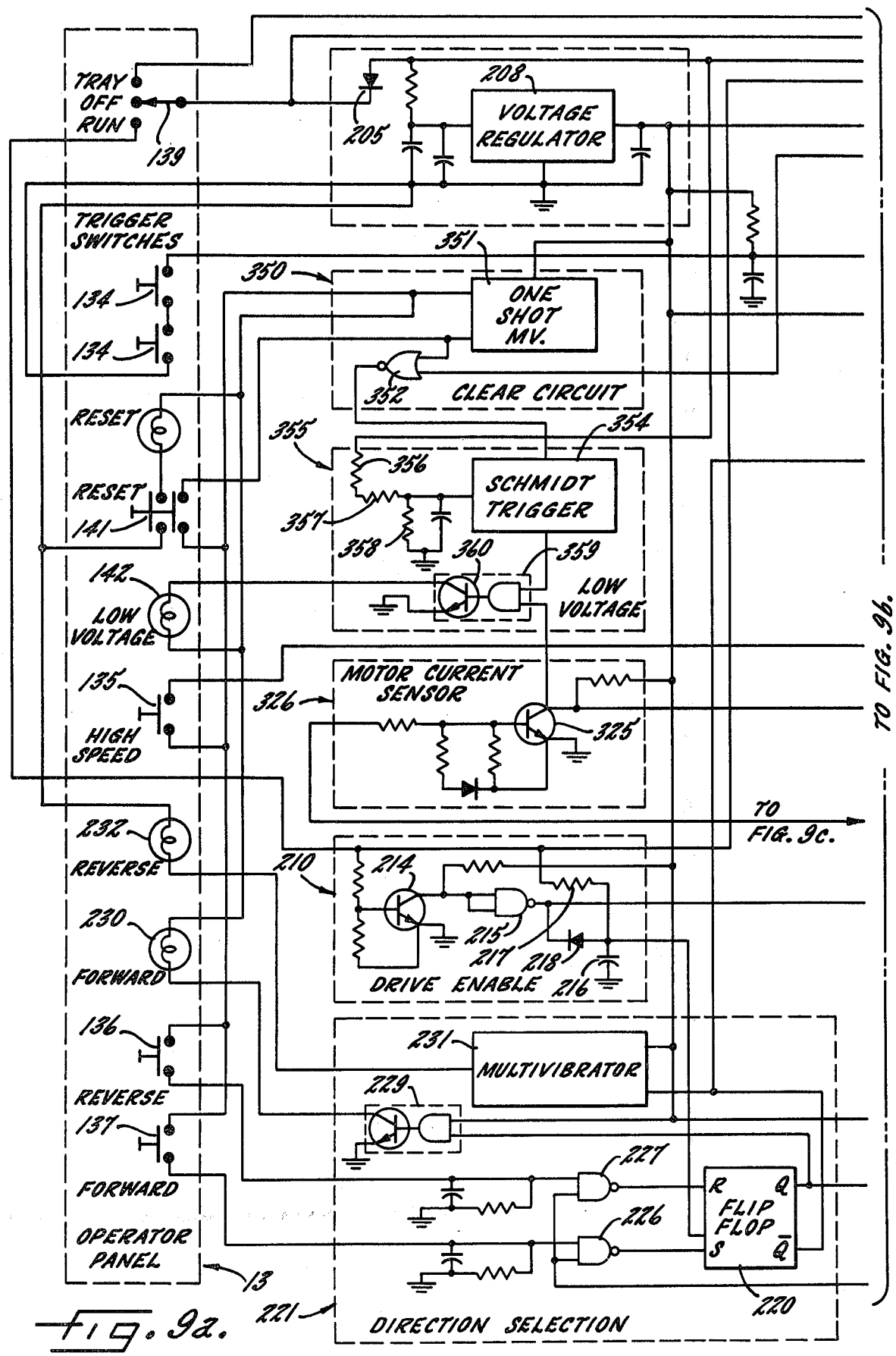

ELECTRICALLY POWERED SERVICE VEHICLE

CROSS REFERENCES TO RELATED APPLICATIONS

1. Ser. No. 468,404 filed May 9, 1974 entitled "Food Serving System", now U.S. Pat. No. 3,924,100.
2. Ser. No. 570,191 filed Apr. 21, 1975 entitled "Food Service Vehicle" (Seider and Freund), now U.S. Pat. No. 242,908.
3. Ser. No. 573,344 filed Apr. 30, 1975 entitled "Electronic Control System For Multiple Electric Heating Stations" (Seider and Freund), now U.S. Pat. No. 3,982,097.
4. Ser. No 573,078 filed Apr. 30, 1975 entitled "Storage System For Hot Food Trays" (Seider, Freund and Duffy), now U.S. Pat. No. 4,019,022.
5. Ser. No. 573,100 filed Apr. 30, 1975 entitled "Control Circuit For Electrically Propelled Vehicle" (Seider and Freund).
6. Ser. No. 573,080 filed Apr. 30, 1975 entitled "Battery Charging System" (Seider and Freund), now U.S. Pat. No. 4,035,709.

DESCRIPTION OF THE INVENTION

The present invention relates generally to electrically powered serve vehicles and, more particularly, to an improved service vehicle having a plurality of programmable electrical stations thereon.

It is a primary object of the present invention to provide an improved service vehicle which has a completely self-contained system for suppling power to multiple stations thereon and for propelling the vehicle. A related object of the invention is to provide such an improved service vehicle which also has a self-contained battery charging system for recharging the vehicle battery by simply connecting it to a conventional a-c. outlet.

It is another object of the invention to provide an improved food service vehicle for use with food service trays having electrical heating elements embedded therein, and wherein the tray heating elements are automatically connected to a controllable power system upon insertion of the trays into the vehicle. In this connection, a related object of the invention is to provide such a food service vehicle which includes manually operable control means for programming the heating of the various trays inserted therein.

A further object of the invention is to provide such an improved service vehicle which has a manually operable control station which permits the operator to control the vehicle drive motor while steering the vehicle. One specific object of the invention is to provide such a control station which includes safety features which ensure that the vehicle remains under the control of the operator at all times.

Other objects and advantages of the invention will be apparent from the following detailed description and the accompanying drawings, in which:

FIG. 1 is a perspective view of a food service vehicle embodying the invention, with segments of the doors broken away to show the internal structure;

FIG. 2 is a top perspective view of a food tray for use in the vehicle of FIG. 1;

FIG. 3 is a bottom perspective of the food tray shown in FIG. 2;

Figure 8:
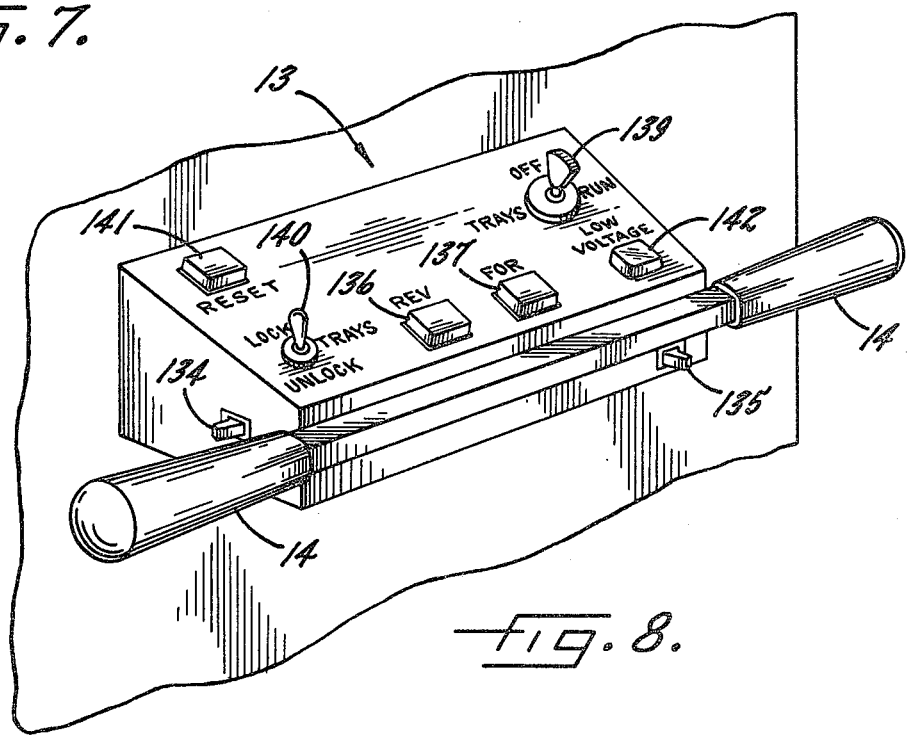
FIG. 8 is an enlarged perspective of the drive control panel on the rear of the vehicle of FIG. 1.
Figure 9B:
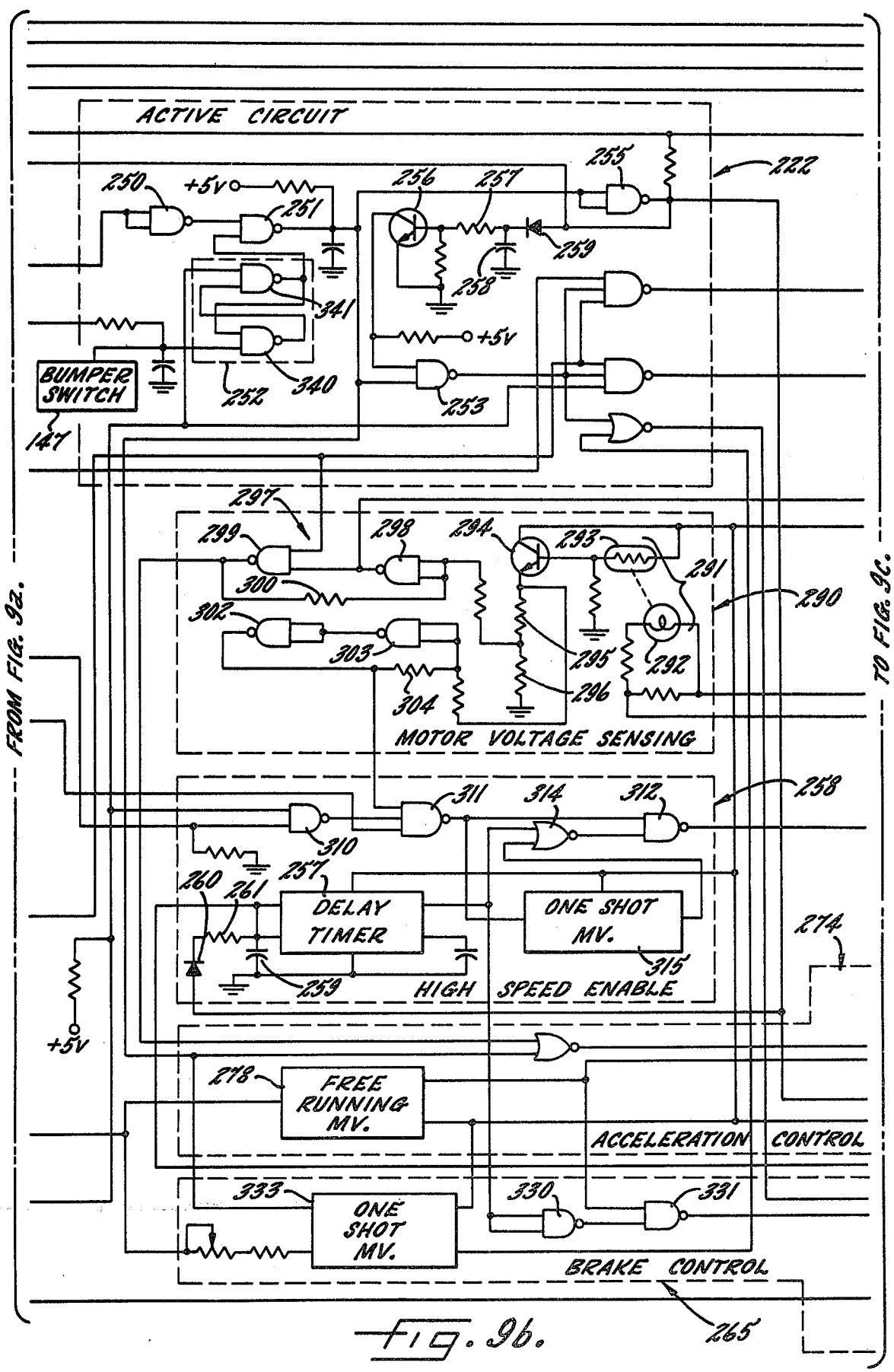
Figure 9C:
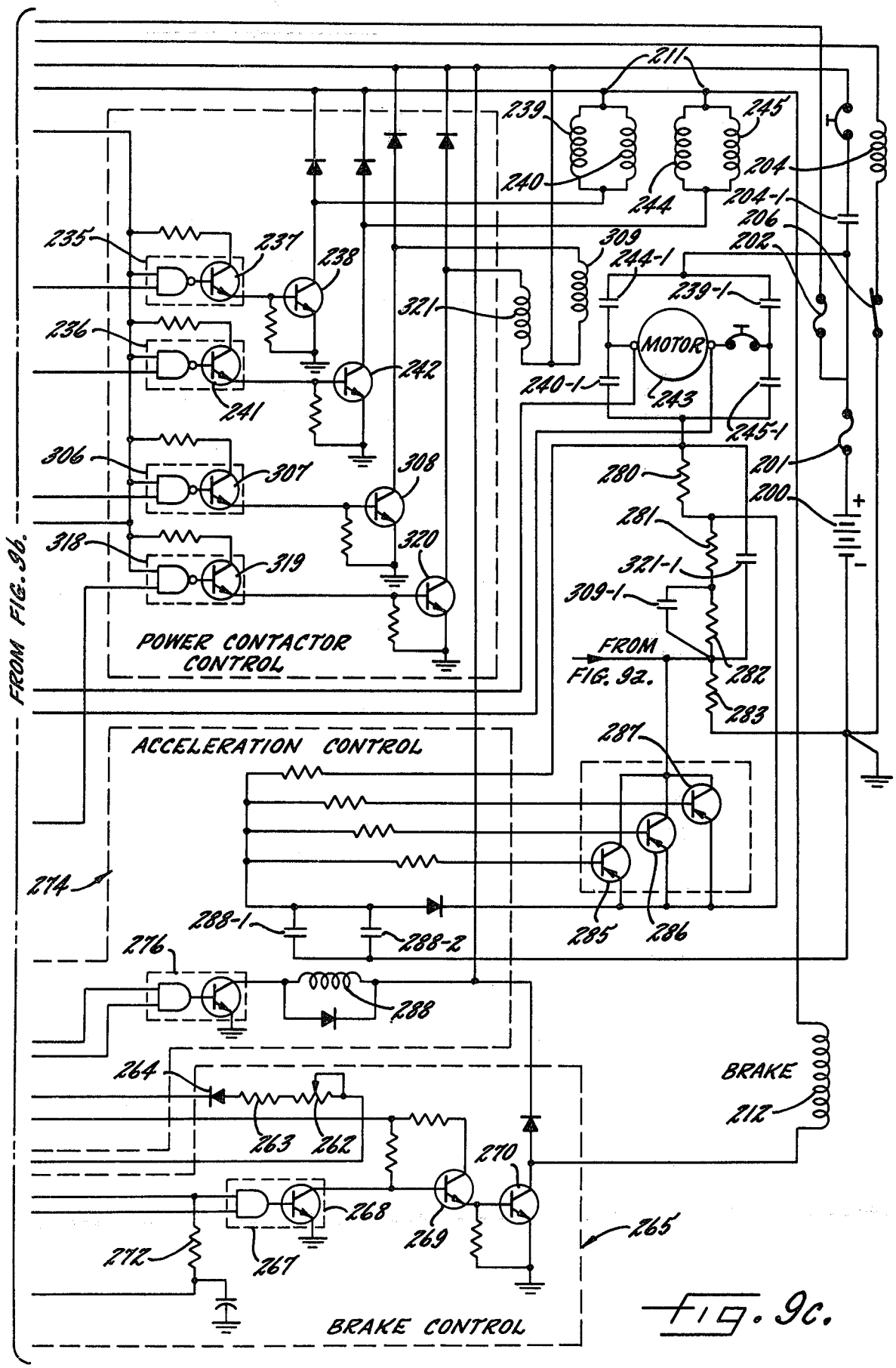
Figure 10:
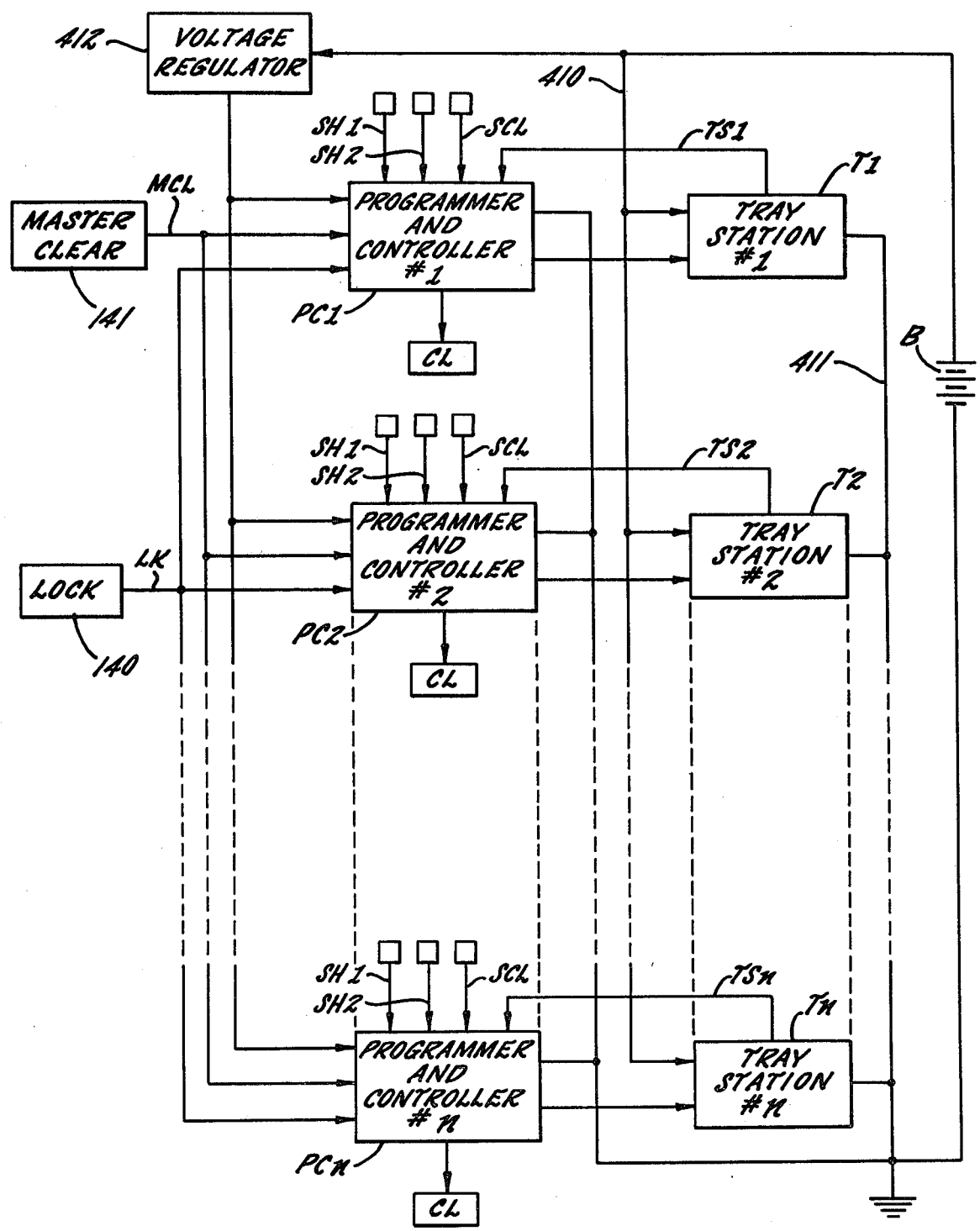
Figure 11:
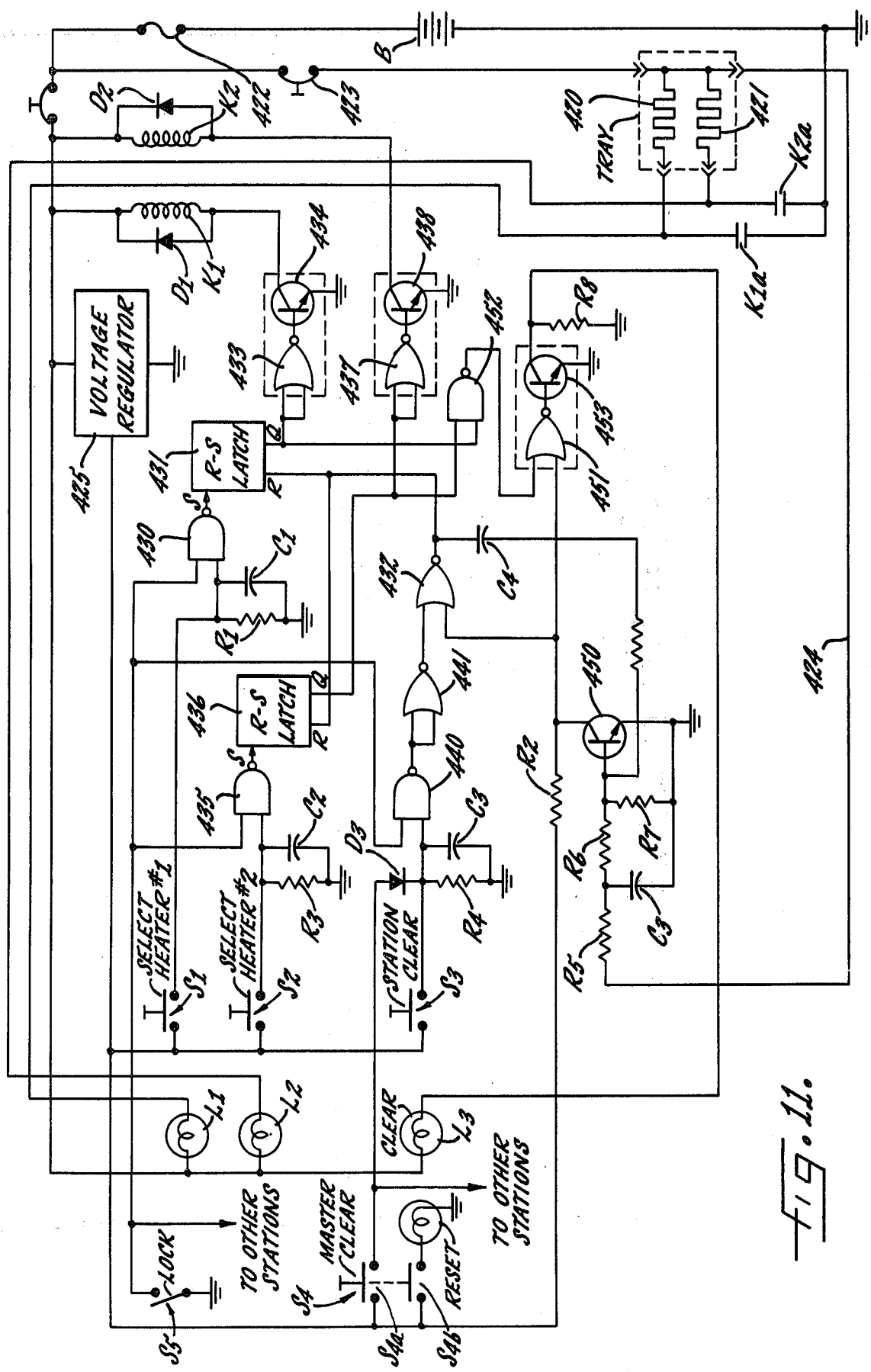

FIGS. 9a-9c, when joined, form a schematic diagram of the drive control system associated with the control panel shown in FIG. 8;

FIG. 10 is a block diagram of the tray heater control system associated with both the rear control panel of FIG. 8 and the side control panel for programming the various tray heaters; and FIG. 11 is a more detailed schematic diagram of an exemplary circuit corresponding to the block diagram of FIG. 10.

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention as defined by the appended claims.

Turning now to the drawings the invention will be described with specific reference to an exemplary food service vehicle, but it will be understood that the invention is equally applicable to many other types of service vehicles designed for different purposes. Referring first to FIG. 1, there is shown a food service vehicle containing three tray storage modules 10, 11 and 12 embodying the system of this invention. The vehicle is self propelled, with the manual drive controls located on a panel 13 carring a pair of handles 14 which are used to steer the vehicle. A second control panel 15 on the side of the vehicle is used to control electrical heating elements which are embedded in each food tray 16 to heat preselected areas 17 and 18 (FIGS. 2 and 3) adapted to receive a hot plate and a soup bowl, respectively. The tray heating elements are connected to the metallic contacts 19 at the rear end of the bottom of the tray. Each tray 16 has a raised lip 20 extending around the entire periphery of the top surface of the tray, and a pair of runners 21 and 22 depending from the bottom of the tray. Each of the modules 10, 11 and 12 has the capacity of holding a number of different trays 16 which are inserted into the modules when they are opened by sliding one or more of the doors 23, 24 and 25 clear of their respective modules. To support the trays in vertically spaced relation within each module, a mulitplicity of horizontal rails 26 and 27 are formed on the opposed side walls 28 and 29 thereof.

To latch the trays in position each of the rails 26 on the right hand side wall 28 of each module forms a raised lug 30 which fits into a notch 31 or 32 (FIG. 3) formed in the runners of each tray 16. When a tray is carrying hot food in the spaces 17 and 18, the tray is inserted with the heater contacts 19 at the rear of the storage module to connect the heaters to a power source housed behind the control panel 15. In this position, it is the notch 31 in the tray runner 21 that registers with the lug 30 to retain the tray within the module. When the tray is carrying soiled dishes, or only cold food, it may be inserted into the module with the heater contacts 19 at the front of the module, in which the notch 32 in the tray runner 22 registers with the lug 30 to retain the tray within the module. In either case, the vertical shoulder formed by the rear side of the lug 30 cooperates with the complementary shoulder formed by the rear edge of one of the notches 31 and 32 to latch the tray in the module when the tray is fully inserted therein.

When the heater contacts 19 are located at the rear of the storage module 10, the contacts engage a corresponding row of spring contacts 40 (FIGS. 4–7) mounted on a land 41 formed by the rear wall of the module. There is one land 41 for each tray station, and the spring contacts thereon are all connected to the on-board power source. The spring contacts 40 not only provide the desired electrical connections to the tray heater elements, but also urge the rear end of the tray upwardly against guiding surfaces 42 and 43 located above the respective rails 26 and 27. This elevates the rear end of the tray slightly above the rails 26 and 27 as can be seen in FIG. 6, thereby urging the forward end of the tray downwardly against the rails 26 and 27 to ensure a positive latch with the lug 30. That is, the guiding surfaces 42 and 43 terminate forwardly of the spring contacts 40, so the surfaces 42 and 43 form a fulcrum located between the spring contacts 40 and the lug 30, on the opposite side of the tray from the lug 30, so that the forward end of the tray is pivoted downwardly against the lug 30. It will be appreciated that the space between each rail 26 or 27 and the adjacent guiding surface 42 or 43 must be slightly greater than the vertical dimension of the tray to permit the runners 21 and 22 to slide over the lug 30 before one of the notches 31 or 32 comes into register with the lug 30.

As seen most clearly in FIG. 6, the spring contacts 40 are secured at one end to the front wall of the land 41 and at the other end to the top of the land 41, with the spring metal being bowed upwardly above the top of the land 41 to meet the tray contacts 19 as they are advanced over the spring contacts 40. On the rear side of the module, the lower fasteners for the spring contacts 40 are connected to power lines 44 leading to the power source for energizing the tray heaters.

Both heated areas 17 and 18 of the trays 16 are preferably located on the same side of the tray so that when the tray is inserted into one of the storage modules with the electrical contacts at the rear of the module, the hot food is positioned along the right hand side wall 28. To prevent the heat from the hot food side of the tray from excessively increasing the temperature on the other side of the tray module, where the cool foods such as salad and the like are located, a blower 50 (FIG. 7) forces fresh air through a filter into a vertical plenum 51 mounted on the rear of each tray module. From the plenum 51, the forced air passes through an air inlet port 52 in the rear wall of the module adjacent the side wall on the hot food side of the tray. Consequently, the incoming forced air flows forwardly through the module over the hot food on the trays, with a diffuser 53 mounted in the inlet port 52 spreading the forced air over the two heated areas 17 and 18.

At the front of the module, the forced air exits through a grill 54 formed in the right hand side of the door 23. Thus, the heat that escapes from the heated regions 17 and 18 is continuously swept forwardly through the module and exhausted through the air outlet provided by the door grill 54, thereby preventing the heat from being carried over to the unheated side of the tray which carries the cool food.

The grill 54 in the module door extends throughout the full height of the module, and a separate forced air inlet port 52 is provided at each tray station so that a separate forced air stream is formed between each pair of adjacent trays. Of course, the trays themselves serve as barriers to block the flow of heat in the vertical direction, but even if a tray is absent from a given station or stations, any heat that escapes upwardly from the forwardly flowing stream of forced air will encounter the forwardly flowing stream at the next air inlet before it can move laterally to the unheated side of the tray.

Figure 5:
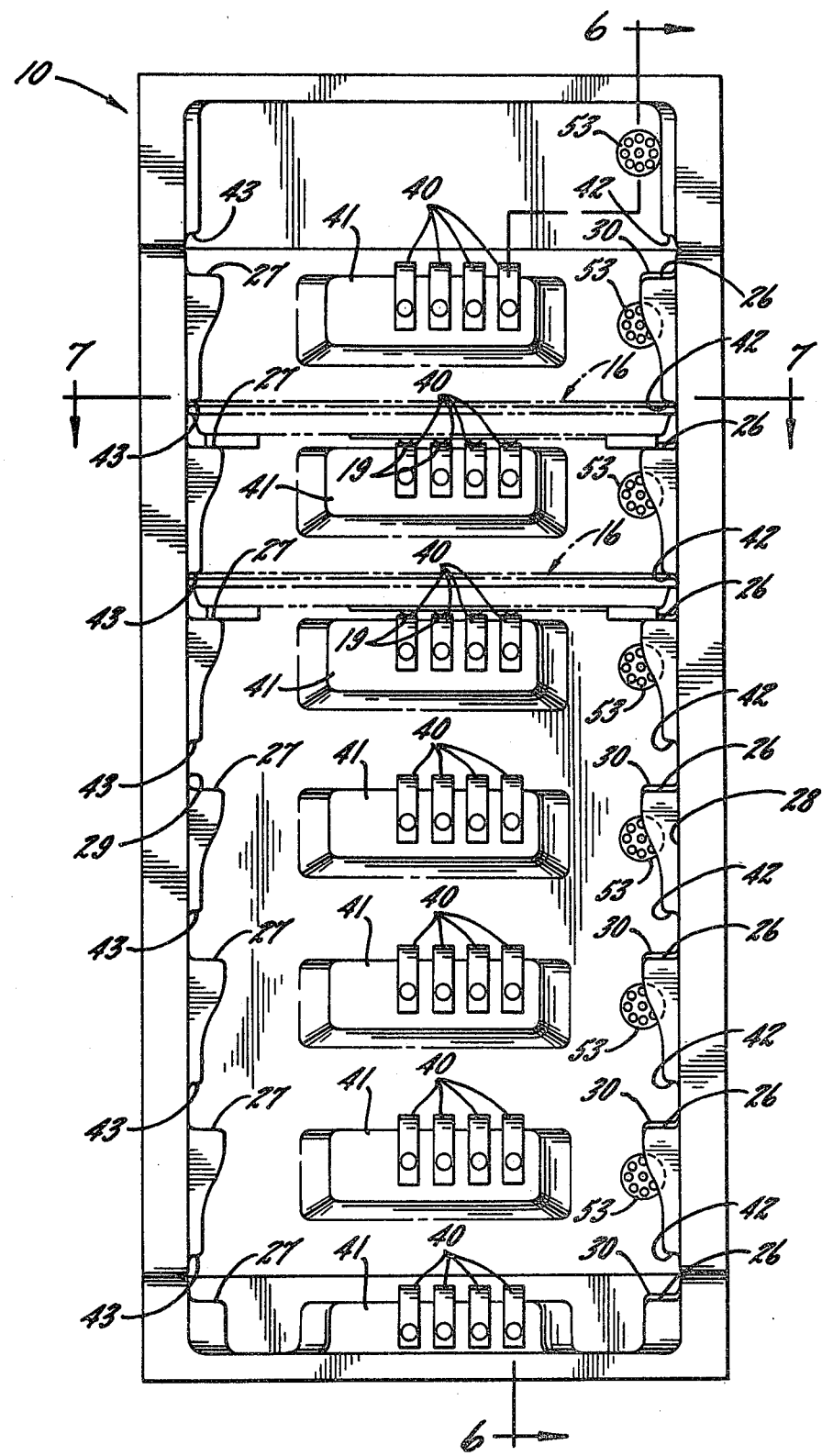
FIG. 5 is an enlarged front elevation of one of the tray storage modules in the vehicle of FIG. 1.
Figure 6:
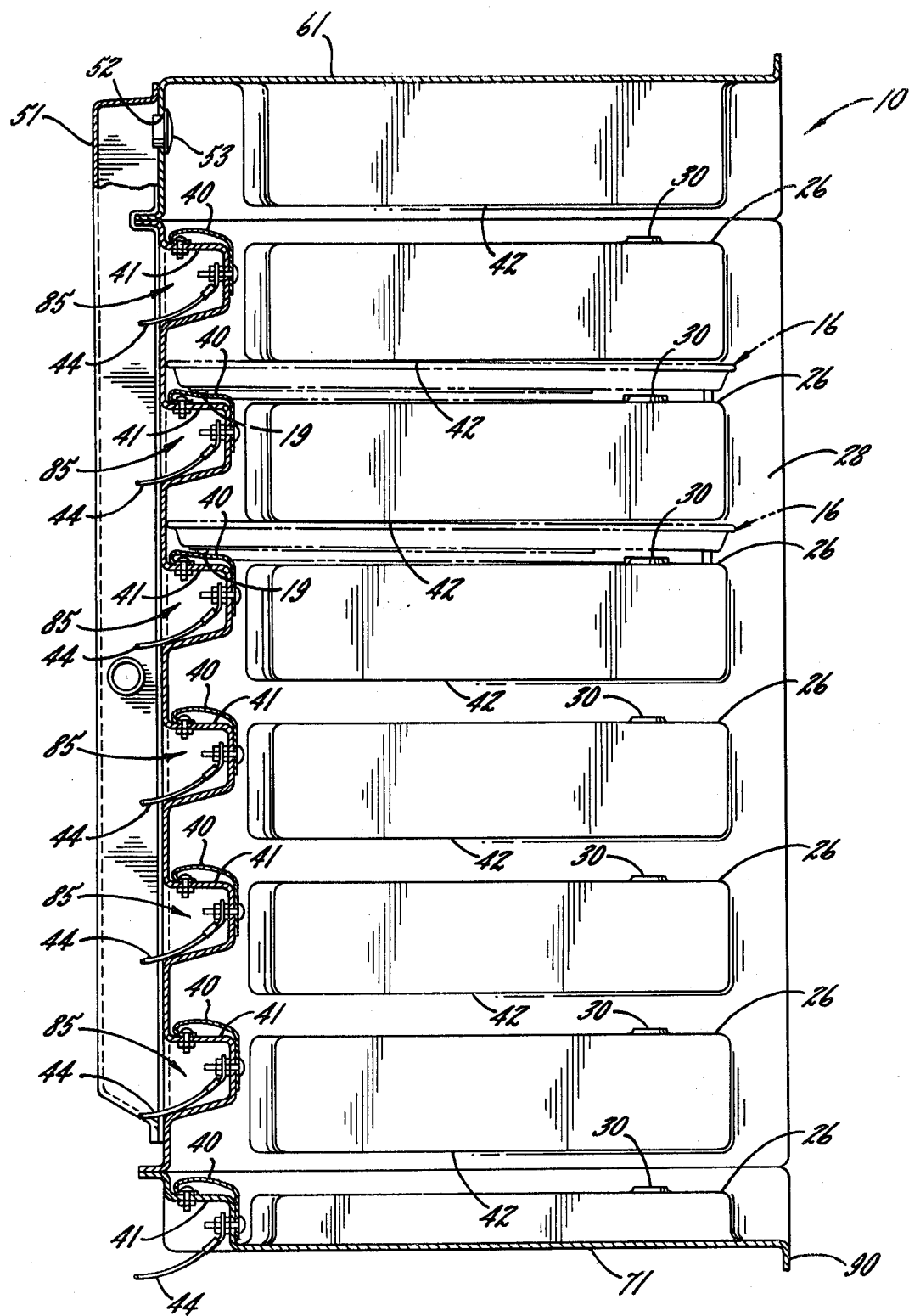
FIG. 6 is a vertical section taken along lines 6—6 in FIG. 5.
Figure 7:
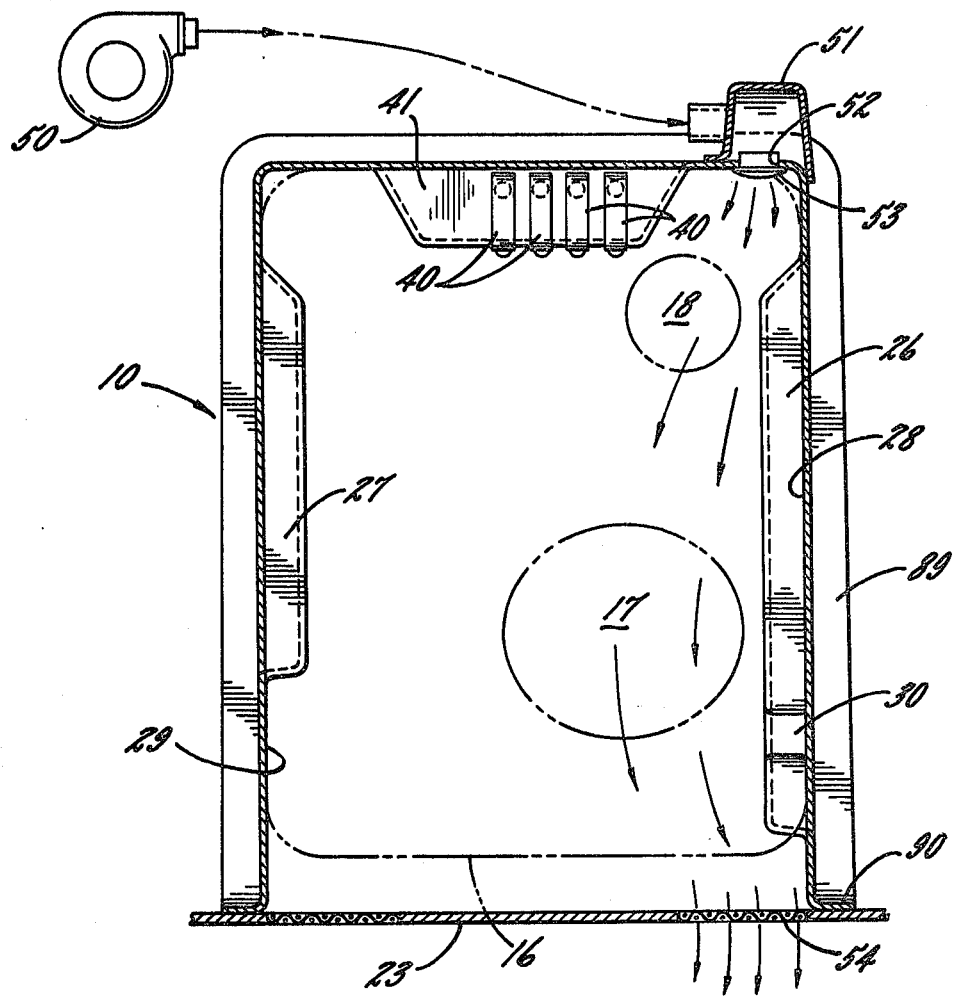
FIG. 7 is a horizontal section taken along lines 7—7 in FIG. 5 and also showing the air blower that is used to ventilate the module and a fragment of the door which also forms a part of the ventilation system, and with arrows indicating the air flow pattern.

As can be seen most clearly in FIG. 5, the air inlet ports 52 are located above the normal level of the hot food sidhes carried by the trays 16, so the forwardly flowing stream of forced air does not have any significant cooling effect on the hot dishes. Rather, the forced air stream picks up the heat that escapes above the hot dishes and carries that heat forwardly through the exit grill 54 so that the heat cannot move laterally to the unheated side of the tray.

For economy of manufacture, each of the three tray modules 10, 11 and 12 comprises vacuum formed top and bottom sections each forming a top or bottom wall of the module and portions of a rear wall and opposed side walls of the module, and a vacuum formed center section forming the balance of the rear and side walls of the module with the center section being folded at the corners of the rear and side walls. The bottom edge of the top section is bonded to the top edge of the center section, and the top edge of the bottom section is bonded to the bottom edge of the center section so as to form a unitary module from the three vacuum formed sections. Thus, referring to FIG. 4, the top section 60 of the tray module 10 is vacuum formed to form the top wall 61 of the module and top portions of the two side walls 28 and 29 and the rear wall. Cavities 62 and 63 are formed in opposite sides of the top section 60 to provide the two uppermost guiding surfaces 42 and 43.

At the lower end of the module, a bottom section 70 forms the bottom wall 71 of the module and lower ends of the side walls 28 and 29 and rear wall. Cavities 72 and 73 formed in the opposed side walls provide the lowermost pair of rails 26 and 27, and a cavity 74 in the rear wall forms the lowermost land 41 on which are mounted the lowermost set of spring contacts 40.

Figure 4:
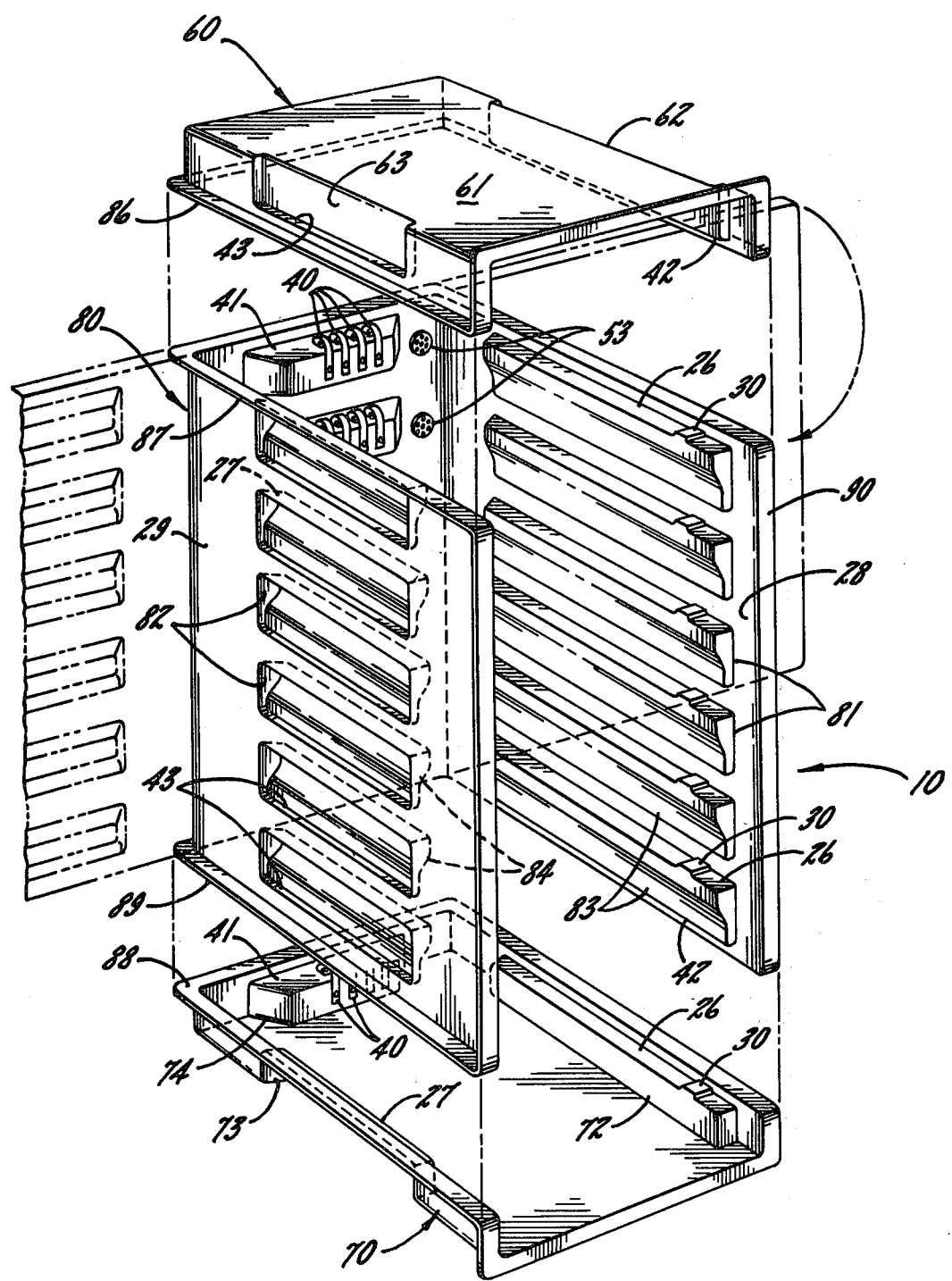
FIG. 4 is an exploded perspective of one of the tray storage modules in the vehicle of FIG. 1, with phantom lines illustrating the center section of the module as initially formed.

The center section 80 of the module is initially formed with the rear wall and the two side walls 28 and 29 lying in a common plane, as illustrated in phantom lines in FIG. 4. To complete the formation of the center section of the module, the end portions thereof are folded perpendicular to the central portion so that the end portions form the opposed side walls 28 and 29 with the central portion forming the rear wall of the module. In other words, the initial vacuum formed article is folded along lines which become the rear corners of the module.

To form the tray rails 26 and 27 and the cooperating guiding surfaces 42 and 43, a plurality of cavities 81 and 82 are formed in the side walls 28 and 29 so that the upper and lower surfaces of the resulting inner projections form the desired rails and guiding surfaces. More particularly, the upper surfaces of the projections formed by the cavities 81 form the guide rails 26 and the lugs 30, the lower surfaces of these same projections form the guiding surfaces 42, the upper surfaces of the projections formed by the cavities 82 form the rails 27, and the lower surfaces of these latter projections form the guiding surfaces 43. As shown most clearly in FIGS. 4 and 5, the elongated vertical surfaces 83 and 84 of the respective cavities 81 and 82 are preferably formed with an ogee configuration so that the lower region of each tray compartment has a wider dimension than the upper region. This is desirable because most of the food containers carried by the trays extend upwardly into only the lower region of the tray compartment. Also, the runners 21 and 22 on the bottoms of the trays are spaced inwardly from the top peripheries of the trays so the guide rails 26 and 27 formed by the top surfaces of the projections must be wider than the guiding surfaces 42 and 43 formed by the lower surfaces thereof.

To form the multiplicity of lands 41 along the rear wall of the module for supporting the rear ends of the trays and carrying the spring contacts 40, a third series of cavities 85 are formed in the rear wall. The lands 41 formed by these cavities 85 are only slightly wider than the space occupied by the spring contacts 40, and the cavities form vertical front walls of sufficient height to form a rigid mounting surface for the lower ends of the spring contacts 40, and also to provide structural rigidity to the lands 41. As can be seen most clearly in FIG. 6, the lower surfaces of the cavities 85 are spaced substantially above the top surfaces of the trays 16 so that they do not interfere with the food containers carried on the trays.

To form a unitary module from the three vacuum formed sections 60, 70 and 80, the mating upper and lower edges of adjacent sections are provided with continuous lateral flanges which are rigidly bonded together by heat sealing, adhesives or the like. Thus, the bottom edge of the upper section 60 and the top edge of the center section 80 include outboard lateral flanges 86 and 87, respectively, extending continuously around the side and rear walls thereof. Similarly, the top edge of the bottom section 70 and the bottom edge of the center section 80 include outboard lateral flanges 88 and 89, respectively, extending continuously around the side and rear walls. When these two pairs of flanges 86, 87 and 88, 89 are bonded together, the resulting unitary module is completely closed except for the air inlet ports and the open front through which the trays 16 are inserted into and removed from the module.

For the purpose of facilitating mounting and alignment of the vacuum formed module in the desired housing, such as the body of the service cart shown in FIG. 1, a lateral flange 90 also extends outwardly from the entire periphery of the module. This front flange 90 also conceals any gaps or rough surfaces in the interface between the module and the adjacent edges of the housing in which it is mounted. It will be recognized that it is a simple matter to form this flange 90 as an integral part of the three module sections 60, 70 and 80 during the vaccum forming operation.

Turning next to the electrical drive system for the illustrative vehicle, the manual control panel 13 includes a pair of trigger switches 134 located adjacent the handles 14 so that they might be engaged by the fingers of an operator to energize the electrical drive system to place the vehicle in motion. As will be described in more detail below, both of the trigger switches must be actuated, and held in an actuated position in order to propel the vehicle, this two handed control forming an important safety feature. A switch 135, reachable by the right hand of the operator is adapted to signal the electrical control system upon actuation to shift into the high speed mode. Reverse and forward switches 136 and 137 respectively are provided for selecting reverse or forward direction. The switches may be lighted, if desired, to indicate to the operator which direction is currently selected. Power is supplied to the vehicle by an on board battery via power contrl switch 139. Momentarily rotating the switch 139 from the central "Off" position to the "Trays" position energizes the tray control circuitry and the power supply for the motor control circuitry. Rotating the switch 139 to the "Run" position serves to apply power to the motor control circuitry, preparing it for driving in response to depression of the trigger switches.

As further features of the control panel 13, a tray lock switch 140 is provided for allowing the programming of the trays, and for locking a program into the circuit when desired. A reset switch 141 is adapted to reset the tray circuitry. Finally, a battery state-of-charge indicator 142 is adapted to be illuminated when internal circuitry senses the need for a battery recharge.

As noted above, power for the electrical drive is provided by an "on board" battery not shown, driving a d.c. motor, also not shown. The motor drives a pair of driving wheels, wheel 145 being illustrated. Pivotable wheels 146 allow manual steering of the vehicle. A bumper 147 projects beyond the front of the vehicle, and is adapted to actuate switches or sensors associated therewith in the event the front of the vehicle engages an object, person, wall, or the like. As will become more apparent, actuation of the bumper switches 147 causes the vehicle to brake, and locks it into a mode whereby the vehicle must be reversed before it may again be driven forward.

Turning now to FIGS. 9a–9c, there is shown the circuitry of an electrical drive and control therefor adapted to propel the food service vehicle of FIG. 1. Circuit power is supplied by an on board battery 200 (FIG. 9c) which may take the form of a standard motive power battery. The selector switch 139 (FIG. 9a) when rotated to the "Trays" position, allows current flow from the positive plate of the battery 200 through fuses 201 and 202, switch 139, and a relay coil 204 to the negative terminal of the battery 200. The relay 204 is thus energized, closing contacts 204-1, locking this power circuit in via diode 205 (FIG. 9a). Switch 206 serves as an interlock, and is held in the closed position by a door covering the electrical system. With the relay 204 thus energized, battery power is supplied to the input of a voltage regulator 208, supplying regulated voltage for the logic circuitry. When the switch 139 is rotated to the Run position, the power portion of the circuit is enabled, the positive terminal of the battery being connected through the switch 139 to an enable circuit 210, to the common terminals of the drive relays 211 and to one of the terminals of a brake 212. The drive enable circuit 210 includes a transistor 214, driven into conduction by the application of voltage through the switch 139. As a result the collector of transistor 214 switches to a low level, causing the output of an inverter 215 to switch high. The high signal from inverter 215 is coupled to an activate circuit 222, and serves as an enabling input for reverse and forward gates 223, 224, respectively. The circuit is thus conditioned for operation, and is prepared to respond to operator initiated signals for driving the vehicle.

For causing the drive circuit to assume the forward mode when initially energized, a capacitor 216 is charged through the switch 139 and a resistor 217 when the switch is placed in the Run position. Accordingly, when the circuit is initially switched to the Run position, the voltage across the capacitor is near zero, applying a supplementary set signal to a direction control flip-flop 220 within a direction selection module 221. As a result, the flip-flop 220 is set, establishing the forward mode. A diode 218, coupled between inverter 215 and capacitor 216 discharges the capacitor whenever the switch 39 is moved from the Run position, assuring that flip-flop 220 will again be set when power is reapplied.

For establishing the direction of vehicle movement, forward and reverse pushbuttons 137, 136 respectively are coupled to associated NAND gates 226, 227. During the quiescent condition, with an enabling signal present on the second input of the NAND gates, depression of the forward or reverse switch will serve to satisfy the associated gate, applying an input to the flip-flop 220. Depression of the reverse switch couples a signal to the reset input of the flip-flop, causing the Q output thereof to go low and the $\bar{Q}$ output high. Similarly, depression of the forward pushbutton 137 satisfies NAND gate 226, applying a set input to the flip-flop 220, causing the Q output to go high. It is seen that the Q output of the flip-flop is coupled through a driver 229 to a forward indicator 230 to illuminate such indicator whenever the circuitry is in the forward mode. The $\bar{Q}$ output of the flip-flop 220 is coupled to the reset input of a multivibrator 231. Accordingly, whenever the flip-flop 220 is in the forward mode, the multivibrator will be held in its reset condition. However, when the flip-flop is switched to the reverse mode, the multivibrator 231 will be allowed to oscillate. The output thereof is coupled to the reverse indicator 232 and serves to flash the reverse indicator showing that the vehicle is ready to move in reverse.

The direction control flip-flop 220 is coupled to the activate circuit 222, the Q output being coupled to NAND gate 224 for enabling forward drive while the $\bar{Q}$ output is coupled to NAND gate 223 for enabling reverse drive. Coupled to the outputs of gates 223, 224 are drivers 235, 236 respectively. When driver 235 is energized by the application of a low signal from the NAND gate 223, transistor 237 within the driver is caused to conduct thereby providing base drive to a transistor 238, causing current flow through contactor coils 239 and 240. Accordingly, contacts 239-1 and 240-1 in the motor power circuit are closed, allowing current flow from the positive terminal of the battery through contacts 239-1, motor 243, contacts 240-1, and the resistor speed control (to be described below) to the negative terminal of the battery. Such direction of current flow causes the motor to rotate driving the vehicle in the reverse direction. Actuation of the driver 236 in response to a low signal from NAND gate 224 causes transistor 241 within the driver to conduct supplying base drive to transistor 242, energizing contactor coils 244 and 245. As a result, contacts 244-1 and 245-1 are closed, reversing the current flow through the motor and causing it to rotate in the opposite or forward direction. As will be apparent, neither of these conditions may occur until the operator demands drive by depression of both of the trigger switches on the control panel.

For causing the vehicle to be driven in the selected direction, the pair of trigger switches 134 are coupled in series between circuit common and an inverter 250. When drive is desired, both trigger switches 134 are depressed, causing the output of inverter 250 to be driven to a high level. This high signal is coupled to a NAND gate 251 whose second input is driven by a bumper switch flip-flop 252. As will become apparent, the flip-flop 252 normally maintains the output thereof at a high level and accordingly, the output of NAND gate 251 is driven to a low level in response to the signal from inverter 250. The low signal from NAND gate 251 is applied to a first input of NAND gate 253. In the quiescent condition, both inputs of NAND gate 253 are maintained at a high level, keeping the output thereof low, and disabling both of drive control NAND gates 223 and 224. However, in response to the low signal from NAND gate 251, the output of NAND gate 253 is driven high thereby to satisfy the selected one of NAND gates 223 and 224. For example, if the flip-flop 220 is in the forward mode, all of the inputs of NAND gate 224 will be at a high level, driving the output thereof low, energizing driver 236 with the result that forward drive relays 244 and 245 will be actuated causing current flow in the motor circuit and forward drive of the vehicle.

The low signal from NAND gate 251 is also applied to the input of an inverter 255, driving the output high to supply base drive to a transistor 256. It is seen that the collector of transistor 256 is coupled to the second input of NAND gate 253, applying a low signal to such input. A time delay circuit comprising resistor 257 and capacitor 258 operating in conjunction with blocking diode 259 causes transistor 256 to delay turning off after the enabling signal is removed. Thus, when the trigger switches 134 are released, the low signal is maintained at the input of inverter 253 for the delay period associated with transistor 256, allowing the vehicle to run for a moment, preventing a jerk on trigger release.

The output of inverter 255 is also coupled via a charge/discharge circuit to a delay timer 257 within a high speed enable circuit 258. When the output of inverter 255 is driven high in response to the depression of both trigger switches, a timing capacitor 259 associated with delay timer 257 begins to charge through diode 260 and resistor 261. As will become more apparent, this charging delay produces an output from the delay timer 257 causing the high speed mode to be locked out for this period. For example, the charging period of the delay timer may be taken as one to two seconds, causing the high speed mode to be locked out for this period, allowing the vehicle to smoothly accelerate before entering the high speed mode. For discharging the capacitor 259, a separate circuit is provided including resistors 262, 263 and diode 264, also driven by inverter 255. Thus, when the trigger switches are released and the output of inverter 255 immediately falls, the capacitor 259 is discharged through the aforementioned resistors and diode. The discharge delay period, which may be selected, for example, as 2.5 seconds, is adapted to provide a time after release of the trigger switches before full braking is applied to stop the vehicle.

An electro-mechanical brake having a coil 212 is driven in response to signals generated in a brake control 265, for stopping the vehicle, and maintaining the vehicle in position when stopped. The coil 212 is normally maintained in the deenergized condition, such condition actuating a mechanical brake associated therewith. When current is supplied to the coil 212, the brake is released allowing the vehicle to move. For releasing the brake in response to depression of the trigger switches, a NOR gate 266 in the activate circuit 222 has a first input coupled to the output of NAND gate 253. Accordingly, when the output of NAND gate 253 is driven high in response to depression of the trigger switches, the output of NOR gate 266 is driven low. This low signal is coupled to the input of a driver 267 within the brake control 265, switching off the output transistor 268 within the driver. In this condition, base current is allowed to flow to transistor 269 which, in turn, supplies base current to transistor 270 causing it to conduct and drawing current through the brake coil 212. As a result, the brake coil is energized and the brake released. A second input of NOR gate 266 is coupled to the brake control 265 for the purpose of a delayed reapplication of the brake after release of the trigger switches. This function will be described in more detail below.

In summary, it is seen that depression of the trigger switches causes the energization of forward or reverse contactors to energize the motor for rotation in the forward or reverse direction. Additionally, the circuitry causes the brake to be released. The output signal of NOR gate 266 is also coupled through a resistor 272 to the inputs of NAND gates 226, 227 in the direction selection module 221. As a result, these NAND gates are disabled as long as the vehicle is in motion, thereby preventing a direction change while the vehicle is moving.

As another feature of the invention, an acceleration control module is provided, responsive to depression of the trigger switches, for bringing the vehicle to speed in a relatively smooth manner. To that end, the output of NAND gate 251 within the activate circuit is coupled to the input of a NOR gate 275 within the acceleration control module 274. As will soon become apparent, the second input of NOR gate 275 is at a low level when the vehicle is at standstill. As a result, the output of NOR gate 275 is driven high, providing an enabling signal to a driver 276. The second input of driver 276 is coupled to the output of a free running multivibrator 278. The frequency of the multivibrator 278 is selected to be rather low, so as to chop the current supplied to the drive motor during the acceleration mode between two distinct levels, one adapted to accelerate the motor alternating with a second adapted to maintain speed, so that the motor may be smoothly accelerated to driving speed. For example, the multivibrator 278 may be arranged to produce a pulsed output signal having a period on the order of 100 milliseconds.

Turning to the motor circuit itself, it is seen that coupled between the motor and the battery is a string of series resistors 280-283. Resistors 280-282 comprise the speed setting resistors, while resistor 283 serves as a current shunt to provide a voltage signal proportional to the amount of current flowing to the motor. Speed control is achieved by removing one or more resistors 280-282 from the series circuit in order to increase the motor speed.

Shunting resistors 281 and 282 are a group of parallel connected transistors 285-287. The transistors are driven into conduction by closure of parallel contacts 288-1 and 288-2. The contacts, in turn, are controlled by coil 288 which is powered by the aforementioned driver 276. Accordingly, in the acceleration mode, when the enabling signal is provided to driver 276 from NOR gate 275, the output of the driver responds to reproduce the waveform of the free running multivibrator 278. The coil 288 is alternately energized and deenergized to alternately close and open contacts 288-1 and 288-2. As a result, the paralleled transistors 285-287 are alternately driven into conduction and out of conduction, alternately shorting and unshorting resistors 281 and 282. When transistors 285-287 are non-conductive, all of resistors 280-283 are in the motor circuit and motor current is, in one example, approximately 40 amps. However, when transistors 285-287 are driven into conduction, only resistors 280 and 283 remain in the motor circuit, and motor current rises, in one example, to approximately 150 amps. Thus, motor current alternates between 40 amps. and 150 amps. at a relatively slow rate, such as 10 Hz, allowing the motor to respond to both current levels. Thus, when 150 amps. is applied the motor tends to accelerate, such acceleration periods being interspersed with what might be termed rest periods of 40 amps. This arrangement results in an acceleration which is rather smooth, approaching the characteristics of a proportional control.

As a further feature, motor volt sensing means are provided, responsive to conditions in the motor circuit for controlling the shifting between various motor control modes. In that regard, it is noted that in addition to the acceleration mode, means are provided for driving the motor in a low speed mode and in a high speed mode. The motor voltage sensing module 290 includes a photo-isolator 291 having a filament 292 and a photo-conductor 293. The filament 292 is coupled across the motor 243 so that the amount of light produced by the filament 292 is determined by the magnitude of the voltage across the motor 243. The light produced by the filament 292 is coupled to the photoconductor 293 so that the resistance of the photoconductor decreases with increasing voltage across the motor. A transistor 294, having its base coupled to the photoconductor 293, and acting as an emitter follower has resistors 295 and 296 coupled in its emitter circuit. Accordingly, the voltage at the emitter of transistor 294, and the voltage at the junction of resistors 295 and 296 is dependent upon the voltage across the motor. A low speed enable circuit 297 comprising NAND gates 298, 299 in conjunction with regenerative feedback resistor 300 form a Schmidt trigger coupled to the junction between resistors 295 and 296. In the instant example, the trigger point of the Schmidt trigger is selected to correspond to 6 volts across the motor 243. When the voltage across the motor is below 6 volts, the output of NAND gate 298 will be maintained at a high level and the output of NAND gate 299 at a low level. However, when the voltage across the motor rises to 6 volts, the Schmidt trigger will abruptly switch, causing the output of NAND gate 298 to be driven to a low level, and the output of NAND gate 299 to a high level. A similar Schmidt trigger 301 comprising NAND gates 302 and 303 in conjunction with feedback resistor 304 form a circuit adapted to shift the motor control into its high speed mode, such control being effective to overcome overloads applied to the motor. In the instant example, Schmidt trigger 301 is adapted to switch when the motor voltage decreases to 4 volts.

With the motor at rest, the output of NAND gate 299 is at a low level. Recalling that this output is coupled to NOR gate 275, it is seen that the output of NOR gate 275 will be driven high when the trigger switches are depressed, as described above. The voltage across the motor will continue to increase as the motor accelerates, and will ultimately reach the 6 volt level at which point the Schmidt trigger 297 will change state. As a result, the corresponding input to NOR gate 275 will be driven to a high level, driving the output of NOR gate 275 low and disabling the acceleration control chopper. The low output of NOR gate 298 is coupled to the input of a driver 306, causing the transistor 307 within the driver to conduct, providing base drive to a transistor 308 and energizing a low speed contactor 309. In response thereto, contacts 309-1 close, shorting resistor 282. In this condition, resistors 280, 281 and 283 remain in the motor circuit, causing the motor to be operated in a steady low speed mode.

For energizing the motor in the high speed mode, the high speed trigger 135 on the control panel 13 is actuated, coupling a high signal to the associated input of a NAND gate 310. The second input of NAND gate 310 is driven by the Q output of flip-flop 220 for disabling the high speed trigger in the reverse mode. Accordingly, in the forward mode, the NAND gate 310 is enabled, allowing the output thereof to be driven low in response to depression of the high speed trigger. This low signal causes the output of a NAND gate 311 to be driven high, such signal being coupled to one of the inputs of a two input NAND gate 312. The second input of NAND gate 312 is supplied by NOR gate 314 which has one of its inputs driven by delay timer 257 and a second input driven by a one shot multivibrator 315. Both the one shot multivibrator 315 and the delay timer 257, in their quiescent condition, maintain low signals at the input of NOR gate 314. However, delay timer 257 is triggered by the initial depression of the trigger switches, causing a high signal to be maintained at the associated input of NOR gate 314 for the period thereof, such as 1 to 2 seconds. This causes the high speed mode to be locked out for this period, allowing smooth acceleration to speed before the high speed mode may be entered. After the delay timer 257 times out, NAND gate 312 will be satisfied in response to depression of the high speed trigger, driving its output low, and energizing a driver 318. In response thereto, current will flow through transistor 319 within the driver, providing base drive to a transistor 320 and energizing a contactor coil 321. Contacts 320-1 will be caused to close, shorting all of resistors 280, 281 and 282. In this condition, full battery voltage is applied to the motor, the only resistance remaining in the motor circuit being the small current shunt 283. As a result, motor speed will increase to its high speed level for operation of the vehicle in that mode.

As another feature of the drive system, means are provided for shifting from low speed to high speed mode to overcome overloads imposed on the motor. The term overload is used herein not to connote an unsafe motor condition, but merely one wherein the torque demanded is greater than that normally required to drive the vehicle on a substantially horizontal surface. For example, the vehicle, while being powered along a hallway may encounter an incline, climbing of which requires additional torque. The torque capability of the motor is limited in the low speed mode, the increased motor current causing the voltage across the motor to begin to drop. If the voltage drops below 4 volts, the Schmidt trigger 301 will be actuated, driving the output of NAND gate 302 low. This signal, applied to the input of NAND gate 311, drives the output thereof high, satisfying NAND gate 312, energizing driver 318 and through it coil 321 to cause the power circuitry to enter the high speed mode. However, in this condition this mode might better be termed a high torque mode since speed does not appreciably increase, the result being to deliver additional power to the motor causing it to deliver increased torque overcome the "overload condition". However as the mode is actuated by closing high speed contactor 321, it will be referred to as the high speed mode.

Immediately upon closure of contacts 321-1, motor voltage and current will rise. In order to prevent the motor control from leaving the high speed mode before the overload condition has passed, means are provided for sensing motor current in order to maintain the circuitry in the high speed mode. To that end, the motor shunt 283 is coupled to the base of a transistor 325 in a motor current sensing module 326. So long as motor current remains above a predetermined level, transistor 325 will be maintained in saturated conduction. The collector of transistor 325 is coupled to one of the inputs of NAND gate 311, thus maintaining the output of NAND gate 311 high (and thereby the high speed mode locked in) so long as motor current remains above the aforementioned predetermined level. When motor current falls off, indicating that the overload condition has passed, the collector of transistor 325 will be allowed to go to a high level, allowing NAND gate 311 to drive its output low, if and only if the motor voltage sensing module indicates that the motor voltage is above 4 volts.

It will be apparent therefore that the control circuit senses both voltage and current in overcoming an overload condition, and thus forms a true torque sensing control. It will be appreciated by those skilled in the art that torque is related to the time integral of the product of voltage and current. As the instant circuit maintains the high torque mode so long as both the voltage and current are beyond predetermined acceptable levels, it is seen that additional power will be delivered to the motor so long as high torque is required. However, immediately upon the passage of the overload, the circuit will be reset and allowed to shift down to low speed operation.

As noted above, when the trigger switches are released, the energized contactors 239, 240 or 244, 245 will be deenergized after the delay period associated with transistor 256. Immediately upon release of the trigger switches the output of inverter 255 will be driven low, discharging capacitor 259 associated with delay timer 257 through the resistors 262, 263 and diode 264. The period of the delay timer is selected to be approximately 2.5 seconds in this discharge mode, maintaining the output thereof low for this discharge delay period. The low output is applied to the input of an inverter 330 within the brake control module 265, the output of inverter 330 forming one of the inputs of NAND gate 331. The second input of NAND gate 331 is driven by the free running multivibrator 278. Accordingly, in this condition, with the delay timer 257 in its discharge timing mode, the output of NAND gate 331 will alternate between high and low levels at the rate of the free running multivibrators 278. The output of NAND gate 331 is coupled to one of the inputs of driver 267. The second input of the driver 267, as noted above, is coupled to NOR gate 266. Since the trigger switches have been released, the first input of NOR gate 266, driven by the output of NAND gate 253 returns to a low level after the delay period associated with transistor 256. However, the second input of NOR gate 266 is driven by a one shot multivibrator 333. As noted above, the one shot multivibrator 333 is triggered by NAND gate 251 to begin timing out immediately upon release of the trigger switches 134. The output of the multivibrator 333 is thus maintained at a high level for the time out period, which, in the illustrated example is approximately 1.5 seconds. As a result, the output of NOR gate 266 will be maintained at a low level for the period associated with the one shot multivibrator 333. At the expiration of this period, such as 1.5 seconds, the driver 267 will be caused to respond to the output of the free running multivibrator 278. Accordingly, the brake coil 212 will be alternately energized and deenergized causing the gradual application of the brake to stop the vehicle. At the termination of the discharge period associated with delay timer 257, the enabling signal will be removed from NAND gate 331, thus driving its output high, and keeping driver 267 energized. In this condition, no base current flows to transistor 269, keeping transistor 270 cut off and preventing current flow through the brake coil 212. As a result, the brake remains actuated until released in response to depression of the trigger switches.

For stopping the vehicle in the event it contacts an object, wall, person or the like, one or more bumper switches 147 are provided on the front of the vehicle. Such switches may be coupled in parallel between ground and the input of a NAND gate 340 within flip-flop 252. As a result, when an object is bumped and the bumper switches actuated, the low input applied to NAND gate 340 causes the output thereof to be driven high, further causing the output of NAND gate 341 in the flip-flop to be driven low. This low signal is coupled to an input of NAND gate 251, preventing such gate from responding to depression of the trigger switches, thereby to stop the vehicle by removing drive and applying the brake. The vehicle is incapable of being reenergized as long as the flip-flop 252 remains in the activated condition. For resetting the flip-flop 252, an input of NAND gate 341 is coupled to the Q output of the direction control flip-flop 220. Accordingly, if the direction control flip-flop is caused to enter the reverse mode, the low signal on the Q output is coupled to the NAND gate 341, causing the output thereof to go high, causing the flip-flop to change state and enabling NAND gate 251 to respond to a depression of the trigger switches. An operator may then reverse the vehicle out of contact with the object which had previously actuated the trigger switches, and then resume normal operation.

Recalling that acceleration of the vehicle under control of the acceleration control module 274 causes alternate low and high current pulses, it will be appreciated that the current in the motor varies in accordance with the pulses. In order to prevent the high current pulses from being interpreted by the transistor 325 as an overload condition, a one shot multivibrator 315 is provided having an input triggered by the output of NAND gate 311, and an output coupled to the input of NOR gate 314. Accordingly, should the Schmidt trigger 301 sense a motor voltage below 4 volts and cause NAND gate 311 to be satisfied, the one shot multivibrator 315 will be triggered by the low going signal from NAND gate 311, its output serving to disable NOR gate 314 for the period of the one shot. The one shot period is selected to be slightly greater than the period of the free running multivibrator 278 so that a low voltage condition at the motor longer than a pulse of the free running multivibrator must be sensed in order to switch the motor control automatically into the high speed mode for overcoming an overload condition.

In order to set up the circuit for operation upon the application of power, a clear circuit 350 is provided having a one shot multivibrator 351 triggered by the application of power, and having an output through NOR gate 352 adapted to reset the system circuitry to its quiescent condition. The clear signal acts through a NOR gate 352 to reset a Schmidt trigger within a low voltage sensing circuit 355. The low voltage sensing circuit includes a resistor divider comprising resistors 356, 357 and 358 coupled across the main battery supply and forming a junction between resistors 357 and 358 serving as an input to the Schmidt trigger 354. When the battery voltage drops below an acceptable level, such as 9 to 10 volts, the Schmidt trigger changes states, providing a high output signal which is coupled to a driver 359. Accordingly, the driver is energized causing the transistor 360 within the driver to conduct and illuminating the low voltage indicator 142 on the control panel. Such a signal informs the operator that a battery charge is necessary.

In order to prevent low voltage sensor 325 from responding to battery voltage decreases caused by the heavy current drawn when the motor is energized, the low voltage sensor is disabled whenever trigger switches 134 are actuated. To that end, the output of NAND gate 255, high when the trigger switches are actuated, is coupled to one input of NOR gate 352 for holding the Schmidt trigger 354 in its reset condition during the time the drive motor is energized.

In FIGS. 10 and 11 there is illustrated the control system associated with the side panel 15, and the tray lock switch 140 and reset switch on the panel 13, for controlling the electrical heaters in the trays 16. Thus, the electrical heaters at each of the tray stations T1–Tn is supplied with power from the on-board battery B via lines 410 and 411. Within each tray station is a switch for connecting and disconnecting the battery B and the respective heating elements, and the switch at each tray position is controlled by a separate programmer and controller PC1, PC2 . . . PCn. The inputs to each programmer and controller PC1–PCn include a control voltage from a voltage regulator 412, two manually controlled "select heater" input signals SH1 and SH2 (the two right hand pushbuttons for each tray station on the panel 13), a manually controlled "station clear" signal SCL (the left hand pushbutton for each tray station on the panel 13), a manually controlled "master clear" signal MCL, a manually controlled "lock" signal LK, and a "tray present" or "tray absent" signal fed back from each tray station via feedback line TS. The outputs from each programmer and controller PC1–PCn control the power switch for the corresponding tray station and a "clear" indicator CL for each station (suitably in the form of an indicator light within the SCL pushbutton on the panel 13).

Referring to FIG. 10, the combination of either or both of the select heater signals SH1 and/or SH2 with a "tray present" signal from the corresponding tray station produces an output signal from the corresponding programmer and controller that energizes either or both of the heater elements by closing the corresponding power switch or switches. After one or more of the heater elements are energized at any tray station, those elements remain energized until (1) the tray is removed from that particular station to generate a "tray absent" signal on the feedback line TS, or (2) a "station clear" signal is generated for that particular station, or (3) a "master clear" signal is generated for all tray stations. The application of any one of these three signals to one of the programmer and controller units removes the enabling output signal from that particular unit and de-energizes the heater elements at the corresponding tray station.

In the event that a "tray present" signal is received at any given programmer and controller unit in the absence of both "select heater" signals SH1 and SH2, that particular programmer and controller automatically produces an output signal to activate the "station clear" indicator CL. This provides a signal to the operator that a tray is in position without any program for heating it.

As another feature of this control system each of the programmer and controller units PC1–PCn includes means for locking in all the control signals to prevent the re-programming or clearing of any of the tray stations. Thus, in the illustrative system each of the programmer and controller units PC1–PCn includes means responsive to the "lock" input signal LK for preventing any of the other input signals SH1, SH2, SCL, MCL or either a "tray present" or "tray absent" signal on line TS from altering the output signal of the programming and controlling unit. It should be noted that this "lock" input signal LK is common to all the tray stations so that it locks in the program for the entire array of stations.

A preferred embodiment of a portion of the control system of FIG. 10, for only one tray station, is shown in more detail in FIG. 11. In this system, heater elements 420 and 421 (embedded in a food tray) at a tray station TS1 are supplied with power from the battery B through a fuse 422, a circuit breaker 423, and a pair of relay contacts K1a and K2a which are used to turn the power circuits on and off. The contacts K1a and K2a are closed by energizing respective relay coils K1 and K2, which in turn are part of a control system responsive to the five manual inputs, namely: a pair of "heater select" switches S1 and S2, a "station clear" switch S3, a "master clear" switch S4, and a "lock" switch S5. The control system is also responsive to a "tray present" or "tray absent" signal produced on line 424 whenever the heating elements 420 and 421 are connected into their power circuits. The primary source of the binary "1" voltage in the illustrative system is a voltage regulator 425 which is connected to the binary B through a circuit breaker 426 and produces a constant voltage output at a level substantially below that of the battery B, e.g., a constant 5 volts.

The "select heater" switches S1 and S2 are used to program the heating elements 420 and 421, i.e., to enable one or both of the relays K1 and K2 for energization to activate the corresponding heater power circuit or circuits by closing one or both of the relay contacts K1a and K2a, respectively. Thus, when the first "select heater" switch S1 is closed, it connects the voltage regulator 425 to ground through a resistor R1, thereby applying a binary "1" signal to one input of a NAND gate 430. A capacitor C1 connected in parallel with the resistor R1 prevents line noise from being interpreted as a signal by shunting it to ground. The other input to the gate 430 is normally connected to a continuous binary "1" signal source (not shown). Consequently, the binary "1" applied to the NAND gate 430 by the closing of the switch S1 changes the output of the gate 430 from a binary "1" to a binary "0", which is applied to the set input of an R-S latch 431. The reset input of the latch 431 normally receives a continuous binary "1" signal as long as the heater elements 420 and 421 are connected in their power circuits, as will be described in more detail below. As a result, when the signal at the set input of the latch 431 changes from a binary "1" to "0", the Q output of the latch 431 changes to a binary "0". This "0" is applied to a NOR gate 433 which has its inputs interconnected to function as an inverter, thereby producing a binary "1" on the base of a transistor 434. This renders the transistor 434 conductive, thereby energizing the relay K1 by connecting it to ground so that current flows therethrough from the battery B. Thus, it can be seen that the gate 433 and transistor 434 form a driver for the relay coil K1, with the driver being actuated by a binary "0" output from the latch 431. A diode D1 is connected in parallel with the relay coil K1 to protect the transistor 434 from the inductive voltage of the coil K1.

Energization of the relay K1 closes the contacts K1a to close the power circuit to the heater element 420. In order to provide a visible indication that the heater element 420 has been energized the closing of the relay contacts K1a also energizes an indicator light L1 from the battery B.

Although the "select heater" switch S1 is only a momentary switch, it will be appreciated that the programming signal produced by the momentary closing of this switch is retained by the R-S latch 431. That is, even though the binary "0" at the set input of the latch 431 reverts to a binary "1" as soon as the switch S1 re-opens, no change occurs in the binary "0" produced at the Q output of the flip-flop. The only way to change the output of the latch 431 is to change the binary "1" signal at the reset input to a binary "0" while a binary "1" is present at the set input.

When a second "select heater" switch S2 is closed, it connects the voltage regulator 425 to ground through a resistor R3, thereby applying a binary "1" signal to one input of a NAND gate 435. A capacitor C2 connected parallel with the resistor R3 shunts line noise to ground to prevent it from being interpreted as a signal. The other input normally connected to a continuous binary "1" signal source (not shown). Consequently, the binary "1" applied to the NAND gate 435 by the closing of the switch S2 changes output of the gate 435 from a binary "1" to a binary "0", which is applied to the set input of an R-S latch 436. The reset input of the latch 436 normally receives a continuous binary "1" signal as long as the heater elements 420 and 421 are connected in their power circuits, as will be described in more detail below. As a result, when the signal at the set input of the latch 436 changes from a binary "1" to "0", the Q output of the latch 436 changes to a binary "0". This "0" is applied to a NOR gate 437 which has its inputs interconnected to function as an inverter, thereby producing a binary "1" on the base of a transistor 438. This renders the transistor 438 conductive, thereby energizing the relay K2 by connecting it to ground so that current flows therethrough from the binary B. Thus, it can be seen that the gate 437 and transistor 438 form a driver for the relay coil K2, with the driver being actuated by a binary "0" output from the latch 436. A diode D2 is connected in parallel with the relay coil K2 to protect the transistor 438 from the inductive voltage of the coil K2.

Energization of the relay K2 closes the contacts K2a to close the power circuit to the heater element 421. In order to provide a visible indication that the heater element 420 has been energized the closing of the relay contacts K2a also energized an indicator light L2 from the battery B.

Although the "select heater" switch S2 is only a momentary switch, it will be appreciated that the programming signal produced by the momentary closing of this switch is retained by the R-S latch 436. That is, even though the binary "0" at the set input of the latch 436 reverts to a binary "1" as soon as the switch S2 re-opens, no change occurs in the binary "0" produced at the Q output of the flip-flop. The only way to change the output of the latch 436 is to change the binary "1" signal at the reset input to a binary "0" while a binary "1" is present at the set input.

There are three different inputs to the control system which are capble of changing the reset inputs to the latches 431 and 436 to binary "0"s, thereby producing binary "1"s, at the outputs of the latches to render the transistors 434 and 438 non-conductive and de-energize the relay coils K1 and K2. These three inputs are (1) the "station clear" switch S3, (2) the "master clear" switch S4, and (3) a "tray absent" signal on line 424. Turning first to the "station clear" switch S3 (the left hand pushbutton for each tray station on panel (5)), when this switch is momentarily closed, it connects the voltage regulator 425 to ground through a resistor R4, thereby applying a binary "1" signal to one input to a NAND gate 440. A capacitor C3 across the resistor R4 shunts line noise to ground. The other input to this gate 40 is normally connected to a continuous binary "1" signal source (not shown), so the closing of the switch S3 results in the production of a binary "0" at the output of the gate 440. This binary "0" is inverted by a NOR gate 441 having its inputs interconnected to function as an inverter, and the resulting binary "1" signal is applied to the NOR gate 432 so as to produce a binary "0" signal which is applied to the reset inputs of both the latches 431 and 436. This converts the outputs of the two latches from binary "0"s to "1"s, thereby turning off both the transistors 434 and 438 and de-energizing the corresponding relay coils K1 nnd K2. Of course, the de-energization of the relay coils K1 and K2 opens the corresponding contacts K1a and K2a to de-energization of the heating elements 420 and 421, respectively. Thus, both the power circuits to the heating elements and the two heater programming channels associated with the "select heater" switches S1 and S2 are reset to their inoperative states.

The "master clear" switch S4 (the "reset" pushbutton on panel 13) operates in the same manner as the "station clear" switch S3, except that the "master clear" switch S4 is connected to the entire array of tray or heater stations, not just the one station illustrated in FIG. 11. Thus, when the "master clear" switch S4 is closed, the contact S4a applies a binary "1" signal to the NAND gate 440 hrough a diode D3, thereby de-energizing the relay coils K1 and K2 in the same manner described above for the "station clear" switch S3. This same binary "1" signal is also applied via line 442 to similar NAND gates associated with all the other tray stations. The second contact S2b of the "master clear" switch S4 energizes a "reset" indicator light to provide a visible indication that the entire control system has been reset.

To disable the heater programming channels whenever the heater elements 420 and 421 are absent from their power circuits, the "tray present" and "tray absent" signals on line 424 control the enabling and disabling of the two R-S latches 431 and 436. When the heater elements 420 and 421 are in place, the "tray present" signal (binary "1") is applied via a voltage divider formed by resistors R5, R6 and R7 to the base of a transistor 450, thereby rendering the transistor 450 conductive. This connects one of the inputs of the NOR gate 434 to ground, thereby producing a binary "1" at the output of the gate 432, which is connected directly to the reset inputs of the two R-S latches 431 and 436. This, of course, enables the two latches 431 and 436 so that the subsequent application of a binary "0" to the set input of either of these latches produces a binary "0" at the Q output of the latch. When the heater elements 420 and 421 are absent from their power circuits, the signal on line 424 changes to a binary "0", i.e., a "tray absent" signal, which renders the transistor 450 non-conductive so that the voltage regulator 425 applies a binary "1" to the input of the NOR gate 432. This produces a binary "0" at the output of the NOR gate 432 which is applied to the reset inputs of the latches 431 and 436, thereby disabling the latches 431 and 436 so that a binary "1" is maintained at the Q output of each latch regardless of whether a binary "1" or "0" is applied to the set input.

Upon removal of food tray from the station TS1 and the resulting disconnection of the heater elements 420 and 421 from their power circuits, a capacitor C4 connected across the base-emitter circuit of the transistor 450 discharges to hold the transistor 450 in a conductive state for a predetermined time interval, e.g., 15 seconds, before the transistor 450 is rendered con-conductive. This time delay avoids the need to re-program the system in the event that the tray is accidentally removed from the tray station TS1 for a brief interval and then immediately re-inserted. After the transistor 450 is rendered non-conductive, a capacitor C5 connected between the base of the transistor 450 and the output of the NOR gate 432 discharges back through the NOR gate 432 to ground to draw circuit away from the base of the transistor 450 while the capacitor C4 continues to discharge, thereby ensuring that the transistor 450 remains non-conductive and does not oscillate. This prevents any possibility of producing a voltage across the exposed electrical contacts provided at the tray station Ts1, which is an important safety feature.

It is also desirable to visibly indicate when the heater elements 420 and 421 are in place, but neither of them has been programmed for energization. When this situation exits, the "tray present" signal (a binary "1") on line 424 renders the transistor 450 conductive to apply a binary "0" to one of the inputs to a NOR gate 451. The other input to this NOR gate 451 is the output of a NAND gate 452 whose two input lines are connected to the outputs of the R-S latches 431 and 436. When neither of the heaters 420 and 421 has been programmed for energization, the outputs of both the latches 431 and 436 are binary "1"s, thereby producing a binary "0" at the output of the gate 452 and at the second input to the NOR gate 451. When this condition prevails, i.e., with binary "0"s on both of the inputs to the NOR gate 451, a binary "1" is produced at theoutput of the gate 451, and applied to the base of a transistor 453. This renders the transistor 453 conductive to energize a "clear" light L3 which indicates that the heater elements 420 and 421 are in place but have not yet been programmed. A resistor R8 connected across the emitter-collector circuit of the transistor 453 draws a "keep alive" current through the "clear" light L3, while the light is de-energized, to avoid any surge of current through the transistor 453 when it is rendered conductive.

In order to permit the operator of the system to lock in all the control signals and prevent any re-programming or clearing of the various heater stations, a "lock" switch S5 (switch 140 on panel 13) is connected between ground and the second inputs of the three NAND gates 430, 435 and 440. When this switch S5 is closed, it applies a binary "0" to the three NAND gates to ensure that binary "1" signals are maintained at the outputs of all three gates 430, 435 and 440. In other words, the closing of the switch S5 disables all three of the NAND gates 430, 435 and 440 so that none of the corresponding switches S1, S2 or S3 can have any effect on the control system even if they are closed.

To facilitate recharging of the on-board battery B, the vehicle preferably also has an on-board battery charging system which can be connected to a conventional a-c. outlet, such as for overnight charging. Any suitable battery charging system may be used for this purpose, but it is preferred to use the improved system described and claimed in our copending application Ser. No. 573,080, now U.S. Pat. No. 4,035,709, entitled "Battery Charging System" and filed concurrently herewith.

We claim as our invention:

1. A food service vehicle for use with food serving trays including internal heating elements for providing localized areas of heat on the trays for maintaining food placed thereon at a desired temperature, said vehicle comprising the combination of at least one storage compartment for holding a plurality of said food serving trays in vertically spaced relation to each other, an on-board d-c. power source, a plurality of electrical contacts within said storage compartment for connecting the d-c. power source to the heating elements within the trays, a plurality of controllable power circuits connected to the electrical contacts associated with each tray station within the compartment for supplying separately controllable power to each individual tray heater, manually operable programming means connected to each power circuit and including means for generating control signals to enable or disable each separate circuit, without supplying power thereto, to permit the programming of the various tray stations within the storage compartment, a d-c. drive motor for propelling the vehicle, and a drive control for selectively connecting said power source to said drive motor.

2. A food service vehicle as set forth in claim 1 wherein said electrical contacts within the storage compartment are positioned to engage corresponding contacts on the trays when the trays are inserted in the storage compartment.

3. A food service vehicle as set forth in claim 1 wherein said manually operable programming means are located on a control panel on an exterior surface of the vehicle.

4. A food service vehicle as set forth in claim 1 which includes tray sensing means at each tray station within the storage compartment for disabling the power circuits associated with the respective tray stations in response to the absence of trays at the respective stations, and for enabling the programming means associated with the respective tray stations in response to the presence of trays at the respective stations.

5. A food service vehicle as set forth in claim 4 which includes indicating means associated with each tray station and responsive to the combination of (1) an enabling signal from said tray sensing means indicating the presence of a tray at said station and (2) a disabling control signal from said programming means for producing a signal indicating that a tray is present at said station and has not been programmed.

6. A food service vehicle as set forth in claim 1 which includes means for locking in all the control signals to prevent the re-programming of any of the tray stations.

7. A food service vehicle as set forth in claim 1 wherein said drive control includes forward and reverse selector means for setting up the drive for movement in the associated direction, trigger means for energizing the drive to propel the vehicle in the selected direction, an electro-mechanical brake, means responsive to actuation of said trigger means for releasing said brake, and delay means responsive to release of said trigger means for reapplying said brake after a predetermined coast down period.

8. A food service vehicle as set forth in claim 1 which includes an on-board charging system for recharging said d-c. power source.

9. A food service vehicle as set forth in claim 1 which includes a resilient bumper on the front of the vehicle, and bumper switch means adapted to be actuated in the event the bumper contacts an external object, said drive control including means responsive to acutation of said bumper switch means for de-energizing said drive motor.

10. A food service vehicle for use with food serving trays including internal heating elements for providing localized areas of heat on one side of the upper surface of each tray for maintaining food placed thereon at a desired temperature, said vehicle comprising the combination of at least one storage compartment for holding a plurality of said food serving trays in vertically spaced relation to each other, said compartment having a rear wall, top and bottom walls, a pair of side walls, and an open front, an on-board d-c. power source, a d-c. drive motor for propelling the vehicle, a drive control for selectively connecting said power source to said drive motor, an air blower powered by said d-c. power source, forced air inlet means in the rear wall of the storage compartment and connected to the air blower for directing a stream of forced air forwardly through the storage compartment on the heated side of the upper surface of the tray, and a door covering the front of the storage compartment with air outlet means adjacent the side wall of the storage compartment on the heated side of the trays so that the forwardly flowing stream of forced air exits through the door.

11. A service vehicle comprising the combination of at least one storage compartment, an on-board d-c. power source, a d-c. drive motor for propelling the vehicle, a drive control for selectively connecting said power source to said drive motor, a plurality of electrical contacts located at selected stations within the storage compartment and adapted to engage corresponding contacts on an electrically operated device when said device is inserted into said compartment, said contacts forming part of a plurality of controllable power circuits connected to said power source, and manually operable programming means connected to each power circuit and including means for generating control signals to enable or disable each separate circuit, without supplying power thereto, to permit the programming of the various stations within the storage compartment.

12. A service vehicle as set forth in claim 11 wherein said manually operable programming means are located on a control panel on an exterior surface of the vehicle.

13. A service vehicle as set forth in claim 11 which includes sensing means at each station within the storage compartment for disabling the power circuits associated with the respective stations in response to a first preselected condition at the respective stations, and for enabling the programming means associated with the respective stations in response to a second preselected condition at the respective stations.

14. A service vehicle as set forth in claim 13 which includes indicating means associated with each station and responsive to the combination of (1) an enabling signal from said sensing means indicating said second preselected condition at said station and (2) a disabling control signal from said programming means, for producing a signal indicating that said second preselected condition exists at said station and said station has not been programmed.

15. A service vehicle as set forth in claim 11 which includes means for locking in all the control signals to prevent the re-programming of any stations.

16. A service vehicle as set forth in claim 11 wherein said drive control includes forward and reverse selector means for setting up the drive for movement in the associated direction, trigger means for energizing the drive to propel the vehicle in the selected direction, an electromechanical brake, means responsive to actuation of said trigger means for releasing said brake, said delay means responsive to release of said trigger means for reapplying said brake after a predetermined coast down period.

17. A service vehicle as set forth in claim 11 which includes an on-board charging system for recharging said d-c. power source.

18. A service vehicle as set forth in claim 11 which includes a resilient bumper on the front of the vehicle, and bumper switch means adapted to actuate said drive control including means responsive to actuation of said bumper switch means for de-energizing said drive motor.

19. A service vehicle comprising the combination of at least one storage compartment having a plurality of vertically spaced support means defining multiple storage stations within the compartment, said compartment having a rear wall, top and bottom walls, a pair of side walls, and an open front, an on-board d-c. power source, a d-c. drive motor for propelling the vehicle, a drive control for selectively connecting said power source to said drive motor, an air blower powered by said d-c. power source, a plurality of vertically spaced force air inlet means in the rear wall of the storage compartment and connected to the air blower for directing multiple streams of forced air forwardly through said multiple storage stations in the storage compartment, and a door covering the front of the storage compartment with air outlet means adjacent the side wall of the storage compartment so that the forwardly flowing streams of forced air exit through the door.

20. A food service vehicle comprising the combination of an on-board d-c. power source; a d-c. drive motor connected to said power source for propelling the vehicle; at least one storage module having a pair of side walls interconnected by a rear wall and including means for supporting a plurality of trays each having at least one hot food position on one side of the serving surface of the tray adjacent one side wall of the module and at least one cool food position on the other side of the serving surface of the tray adjacent the other side wall; an air blower powered by said d-c. source for forcing air through inlet means in the rear wall of the module at each tray position and adjacent the module side wall on the hot food side of the trays so that incoming forced air flows forwardly through the module over the hot food position on each of the trays; and a door covering the front of the module with air outlet means adjacent the module side wall on the hot food side of the module so that the forwardly flowing air exits through the door so as to maintain a temperature differential between the hot and cool food positions on each of the trays.

21. A food service vehicle as set forth in claim 20 wherein the forced air inlet means comprises a plurality of ports in the rear wall of the module, each of said ports being located in predetermined distance above one of the tray surfaces.

22. A food service vehicle as set forth in claim 20 wherein said module includes means for supplying power to electrical heaters in the tray on the hot food side thereof.

23. A food service vehicle comprising the combination of an on-board d-c. power source; a d-c. drive motor connected to said power source for propelling the vehicle; at least one storage module having a pair of side walls interconnected by a rear wall and including means for supporting a plurality of trays each having at least one hot food position on one side of the serving surface of the tray adjacent one side wall of the module and at least one cool food position on the other side of the serving surface of the tray adjacent the other side wall; an air blower powered by said d-c. source; and air inlet means at each tray position for directing forced air from said blower over each of said trays on the hot food side of the module and through the front of the module so as to maintain a temperature differential between the hot food and the cool food on said trays.

* * * * *